(12) United States Patent
Wei

(10) Patent No.: US 10,608,550 B2
(45) Date of Patent: Mar. 31, 2020

(54) POWER CONVERSION APPARATUS

(71) Applicant: Chen-Yi Wei, Taipei (TW)

(72) Inventor: Chen-Yi Wei, Taipei (TW)

(*) Notice: Subject to any disclaimer, the term of this patent is extended or adjusted under 35 U.S.C. 154(b) by 0 days.

(21) Appl. No.: 16/224,831

(22) Filed: Dec. 19, 2018

(65) Prior Publication Data

US 2019/0199234 A1 Jun. 27, 2019

Related U.S. Application Data

(60) Provisional application No. 62/609,350, filed on Dec. 22, 2017.

(51) Int. Cl.
| | | |
|---|---|---|
| *H02M 7/155* | (2006.01) | |
| *H01F 27/28* | (2006.01) | |
| *H01F 27/06* | (2006.01) | |
| *H02M 3/335* | (2006.01) | |
| *H01F 19/00* | (2006.01) | |

(Continued)

(52) U.S. Cl.
CPC ............ *H02M 7/155* (2013.01); *H01F 19/00* (2013.01); *H01F 27/06* (2013.01); *H01F 27/2804* (2013.01); *H02M 3/33523* (2013.01); *H02M 3/33592* (2013.01); *H01F 2019/085* (2013.01); *H01F 2027/065* (2013.01); *H02M 2001/0009* (2013.01)

(58) Field of Classification Search
CPC ............ H02M 7/155; H02M 3/33592; H02M 3/33523; H02M 2001/0009; H01F 27/06; H01F 27/2804; H01F 2027/065; H01F 19/00; H01F 2019/085
See application file for complete search history.

(56) References Cited

U.S. PATENT DOCUMENTS

| | | | |
|---|---|---|---|
| 6,380,836 B2* | 4/2002 | Matsumoto | ............ H01F 19/04 336/200 |
| 8,203,418 B2* | 6/2012 | Harrison | ............ H01F 19/04 336/192 |
| 8,772,909 B1 | 7/2014 | Vinciarelli | |

(Continued)

FOREIGN PATENT DOCUMENTS

| | | |
|---|---|---|
| TW | I434396 | 4/2014 |
| TW | I581555 | 5/2017 |

*Primary Examiner* — Adolf D Berhane
*Assistant Examiner* — Kevin H Sprenger
(74) *Attorney, Agent, or Firm* — JCIPRNET

(57) ABSTRACT

A power conversion apparatus including a circuit board, a transformer, a first circuit, a second circuit, a first main coil, and a second main coil is provided. The transformer, the first circuit, and the second circuit are disposed on the circuit board. The transformer has a first winding and a second winding. The first circuit is coupled to and provides an input voltage to the first winding. The first end of the second winding is configured to provide an output voltage. The second circuit is coupled to the second winding. The first main coil is coupled to the first circuit. The second main coil is printed on the circuit board and coupled between the second circuit and a first reference potential terminal. The first main coil and the second main coil are electrically insulated from each other and magnetically coupled to each other. The first circuit and the second circuit perform digital signal communication through the first main coil and the main second coil to control the voltage value of the output voltage.

13 Claims, 7 Drawing Sheets

(51) Int. Cl.
*H01F 19/08* (2006.01)
*H02M 1/00* (2006.01)

(56) References Cited

U.S. PATENT DOCUMENTS

| | | | |
|---|---|---|---|
| 9,331,004 B2 | 5/2016 | Balakrishnan et al. | |
| 9,742,288 B2 | 8/2017 | Balakrishnan et al. | |
| 2002/0122320 A1* | 9/2002 | Brkovic | H02M 1/36 363/21.08 |
| 2009/0027926 A1* | 1/2009 | Yang | H02M 3/33592 363/21.14 |
| 2015/0236597 A1* | 8/2015 | Hinz | H02M 1/08 363/21.17 |
| 2016/0182131 A1* | 6/2016 | Mednik | H02M 3/33523 455/41.1 |
| 2016/0307690 A1* | 10/2016 | Madsen | H01F 27/2804 |
| 2016/0329819 A1* | 11/2016 | Chen | H02M 3/33515 |
| 2017/0309391 A1* | 10/2017 | Eicher | H01F 27/2804 |

\* cited by examiner

POWER CONVERSION APPARATUS

CROSS-REFERENCE TO RELATED APPLICATION

This application claims the priority benefit of U.S. provisional application Ser. No. 62/609,350, filed on Dec. 22, 2017. The entirety of the above-mentioned patent application is hereby incorporated by reference herein and made a part of this specification.

BACKGROUND OF THE DISCLOSURE

Field of the Disclosure

The present disclosure relates to a power supply apparatus, and more particularly to a low-cost power conversion apparatus.

Description of Related Art

In general, isolated switching power conversion apparatus typically has a photo-coupler. The photo-coupler can transmit the feedback signal of the secondary side of the power conversion apparatus to the primary side of the power conversion apparatus, so that the controller on the primary side can control on and off of the power switch on the primary side according to the feedback signal, thereby adjusting the output voltage or output current of the power conversion apparatus. However, the photo-coupler has the disadvantages of slow photoelectric conversion rate, easy aging of the light-emitting diode, and excessive power consumption. Therefore, a digital isolated transmitter has been developed. Although the digital isolated transmitter has the advantage of a fast signal transmission speed, it is manufactured by using a high-end semiconductor manufacturing process, so the cost is high. If the digital isolated transmitter is applied to a low-cost switching power conversion apparatus, it is not cost effective.

SUMMARY OF THE DISCLOSURE

In view of foregoing, the present disclosure provides a power conversion apparatus, which uses a magnetic coupling element as a signal transmission medium between the primary side and the secondary side of the power conversion apparatus, thereby effectively reducing the cost of power conversion apparatus.

A power conversion apparatus of the present disclosure includes a circuit board, a transformer, a first circuit, a second circuit, a first main coil, and a second main coil. The transformer is disposed on the circuit board. The transformer has a first winding and a second winding. The first end of the first winding is configured to receive an input voltage. The first end of the second winding is configured to provide an output voltage. The first circuit is disposed on the circuit board. The first circuit is coupled to the first end of the first winding and provides an input voltage, and coupled to the second end of the first winding. The second circuit is disposed on the circuit board. The second circuit is coupled to the first end of the second winding to receive an output voltage, and coupled to the second end of the second winding. Two ends of the first main coil are coupled to the first circuit. The second main coil is printed on the circuit board. The first end of the second mail coil is coupled to the second circuit, and the second end of the second main coil is coupled to the first reference potential terminal. The first main coil is magnetically coupled to the second main coil, and the first main coil and the second main coil are electrically insulated from each other. The first circuit and the second circuit perform digital signal communication through the first main coil and the second main coil to control the voltage value of the output voltage.

In an embodiment of the disclosure, the circuit board has a first surface and a second surface opposite to each other. The first main coil is printed on the first surface of the circuit board. The second main coil is printed on the second surface of the circuit board. The orthogonal projection of the area surrounded by the second main coil on the first surface at least partially overlaps the area surrounded by the first main coil.

In an embodiment of the disclosure, the circuit board has a first surface and a second surface opposite to each other. The first main coil includes a first sub-coil and a second sub-coil. The first end of the first sub-coil is coupled to the first circuit. The second end of the first sub-coil is coupled to the second reference potential terminal. The first end of the second sub-coil is coupled to the first circuit. The second end of the second sub-coil is coupled to the second reference potential terminal. The first sub-coil and the second sub-coil are printed on the first surface of the circuit board. The second main coil is printed on the second surface of the circuit board. The orthogonal projection of the area surrounded by the second main coil on the first surface at least partially overlaps the area surrounded by the first sub-coil. The second sub-coil is located on a side of the first sub-coil. The area surrounded by the first sub-coil does not overlap the area surrounded by the second sub-coil.

In an embodiment of the disclosure, the first circuit and the first main coil are integrated in a package structure. The first circuit and the first main coil are the die and the lead frame in the package structure, respectively. The first circuit and the first main coil are electrically connected to each other through a bonding wire. The orthogonal projection of the area surrounded by the first main coil on the circuit board at least partially overlaps the area surrounded by the second main coil.

Based on the above, the power conversion apparatus proposed by the present disclosure uses a magnetic coupling element such as coils as a signal transmission medium between the primary side and the secondary side of the power conversion apparatus. Since the magnetic coupling element has the advantage of low cost, the manufacturing cost of the power conversion apparatus can be effectively reduced.

In order to make the aforementioned features and advantages of the disclosure more comprehensible, embodiments accompanying figures are described in detail below.

DESCRIPTION OF EMBODIMENTS

Figure 1:
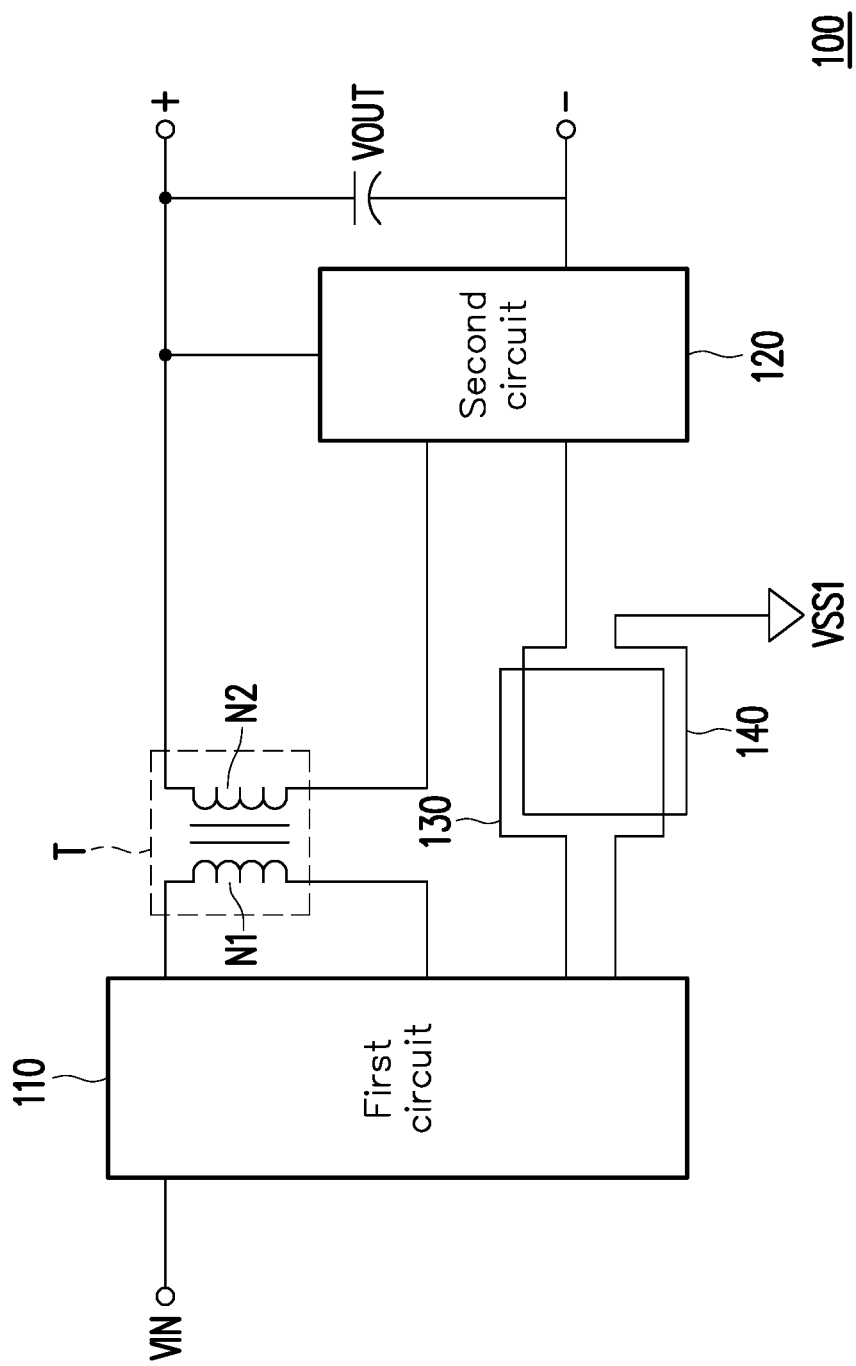
FIG. 1 is a circuit block diagram of a power conversion apparatus according to an embodiment of the disclosure.

In order to make the content of the present disclosure to be more comprehensible, the following specific embodiments are examples of the disclosure that can be implemented. In addition, wherever possible, the elements/components/steps denoted by the same reference signs in the drawings and embodiments represent the same or similar parts.

The power conversion apparatus of the present disclosure is an isolated power conversion apparatus, and its structure may be flyback type, push-pull type, forward type, half-bridge type, full-bridge type or other types of structure, the disclosure provides no limitation to the structure of the power conversion apparatus.

FIG. 1 is a circuit block diagram of a power conversion apparatus according to an embodiment of the disclosure. Referring to FIG. 1, the power conversion apparatus 100 may include a circuit board (not shown), a transformer T, a first circuit 110, a second circuit 120, a first main coil 130 and a second main coil 140, but the disclosure is not limited thereto. The transformer T, the first circuit 110 and the second circuit 120 are disposed on the circuit board. The transformer T has a first winding N1 and a second winding N2. One of the first winding N1 and the second winding N2 may be a primary side winding, and the other one of the first winding N1 and the second winding N2 may be a secondary side winding. The first end of the first winding N1 is configured to receive the input voltage VIN (through the first circuit 110), and the first end of second winding N2 is configured to provide the output voltage VOUT.

The first circuit 110 is coupled to the first end of the first winding N1 to provide an input voltage VIN, and coupled to the second end of the first winding N1. The second circuit 120 is coupled to the first end of the second winding N2 to receive the output voltage VOUT, and coupled to the second end of the second winding N2. Two ends of the first main coil 130 are coupled to the first circuit 110. The second main coil 140 is printed on the circuit board. The first end of the second main coil 140 is coupled to the second circuit 120, and the second end of the second main coil 140 is coupled to the first reference potential terminal VSS1. The first main coil 130 is magnetically coupled to the second main coil 140, and the first main coil 130 and the second main coil 140 are electrically insulated from each other. In particular, the first circuit 110 and the second circuit 120 may perform digital signal communication through the first main coil 130 and the second main coil 140 to control the voltage value of the output voltage VOUT.

It can be understood that the first main coil 130 and the second main coil 140 are magnetic coupling elements for use as a digital signal transmission medium between the first circuit 110 and the second circuit 120. The magnetic coupling element has the advantage of low cost, so the manufacturing cost of the power conversion apparatus 100 can be effectively reduced and the purpose of high integration can be achieved.

In an embodiment of the disclosure, one of the first main coil 130 and the second main coil 140 may serves as a signal transmitter, and the other one of the first main coil 130 and the second main coil 140 may serves as a signal receiver.

In an embodiment of the disclosure, the coil shapes of the first main coil 130 and the second main coil 140 may be any shape, such as a circle, a square, or a spiral. The present disclosure provides no limitation to the coil shape of the first main coil 130 and the second main coil 140. The coil shape of the first main coil 130 and the second main coil 140 may be determined depending on the actual application or design requirement. In addition, the present disclosure provides no limitation to the number of turns of the first main coil 130 and the number of turns of the second main coil 140, and the number of turns of the first main coil 130 may be the same as or different from the number of turns of the second main coil 140, which may be determined depending on the actual application or design requirement.

Figure 2A:
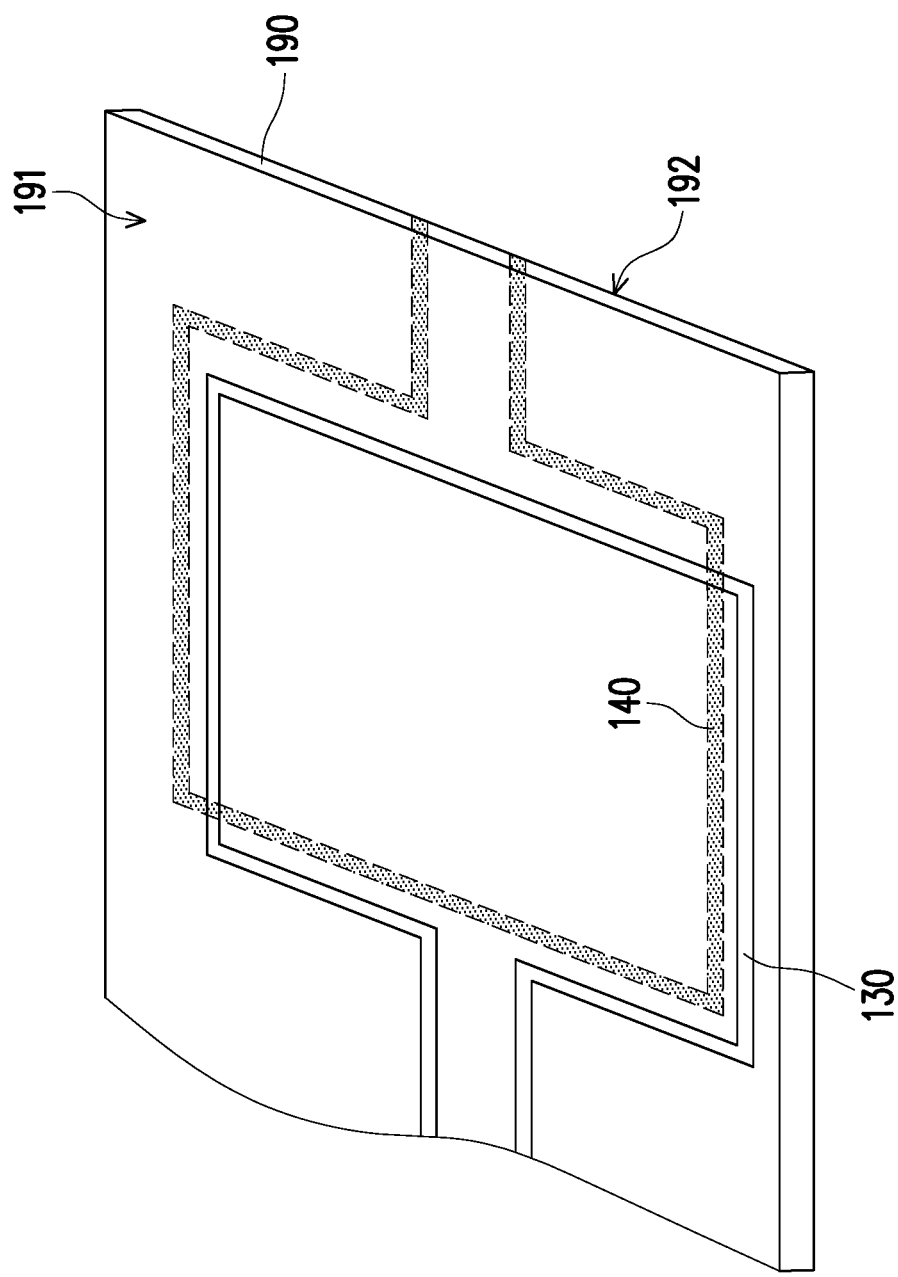
FIG. 2A is a schematic diagram showing the configuration of a first main coil and a second main coil on a circuit board according to an embodiment of the disclosure.

In an embodiment of the disclosure, the first main coil 130 of FIG. 1 may also be printed on the circuit board. In detail, FIG. 2A is a schematic diagram of a configuration of a first main coil and a second main coil on a circuit board according to an embodiment of the disclosure. Please refer to FIG. 1 and FIG. 2A together. The circuit board 190 of the power conversion apparatus 100 has a first surface 191 and a second surface 192 opposite to each other. The first main coil 130 may be printed on the first surface 191 of the circuit board 190, and the second main coil 140 may be printed on the second surface 192 of the circuit board 190, wherein the orthogonal projection of the area surrounded by the second main coil 140 on the first surface 191 at least partially overlaps the area surrounded by the first main coil 130.

Figure 2B:
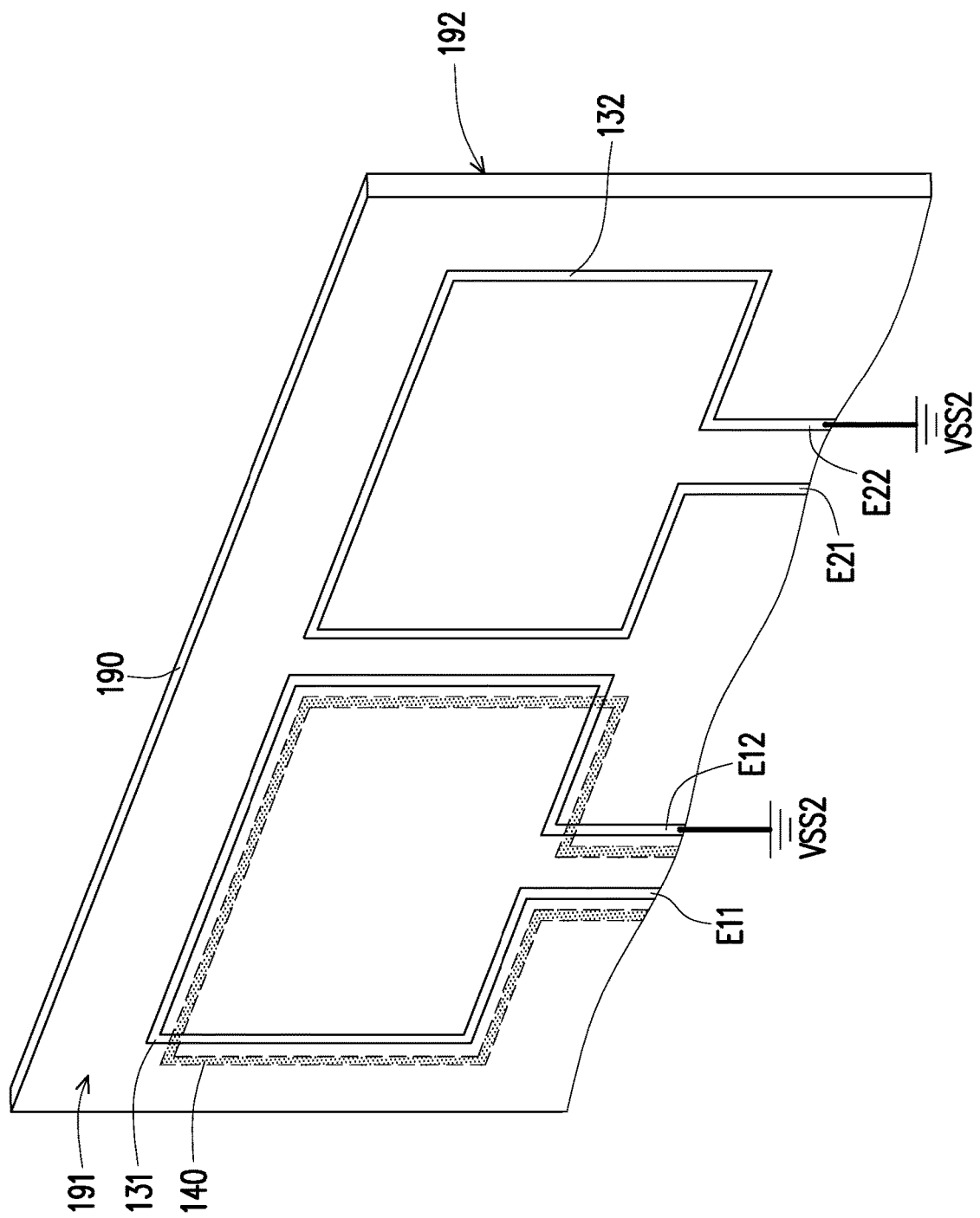
FIG. 2B is a schematic diagram showing the configuration of a first main coil and a second main coil on a circuit board according to another embodiment of the disclosure.

FIG. 2B is a schematic diagram showing the configuration of a first main coil and a second main coil on a circuit board according to another embodiment of the disclosure. Please refer to FIG. 1 and FIG. 2B together. The circuit board 190 of the power conversion apparatus 100 has the first surface 191 and the second surface 192 opposite to each other. The first main coil 130 of FIG. 1 may include the first sub-coil 131 and the second sub-coil 132. The first end E11 of the first sub-coil 131 is coupled to the first circuit 110. The second end E12 of the first sub-coil 131 is coupled to the second reference potential terminal VSS2. The first end E21 of the second sub-coil 132 is coupled to the first circuit 110. The second end E22 of the second sub-coil 132 is coupled to the second reference potential terminal VSS2. The first sub-coil 131 and the second sub-coil 132 are printed on the first surface 191 of the circuit board 190. The second main coil 140 is printed on the second surface 192 of the circuit board 190. The orthogonal projection of the area surrounded by the second main coil 140 on the first surface 191 at least partially overlaps the area surrounded by the first sub-coil 131. The second sub-coil 132 is located on a side of the first sub-coil 131. The area surrounded by the first sub-coil 131 does not overlap the area surrounded by the second sub-coil 132. The configuration of the first sub-coil 131 and the second sub-coil 132 can effectively reduce the interference of the ambient noise to the first sub-coil 131 and the second sub-coil 132.

Figure 3A:
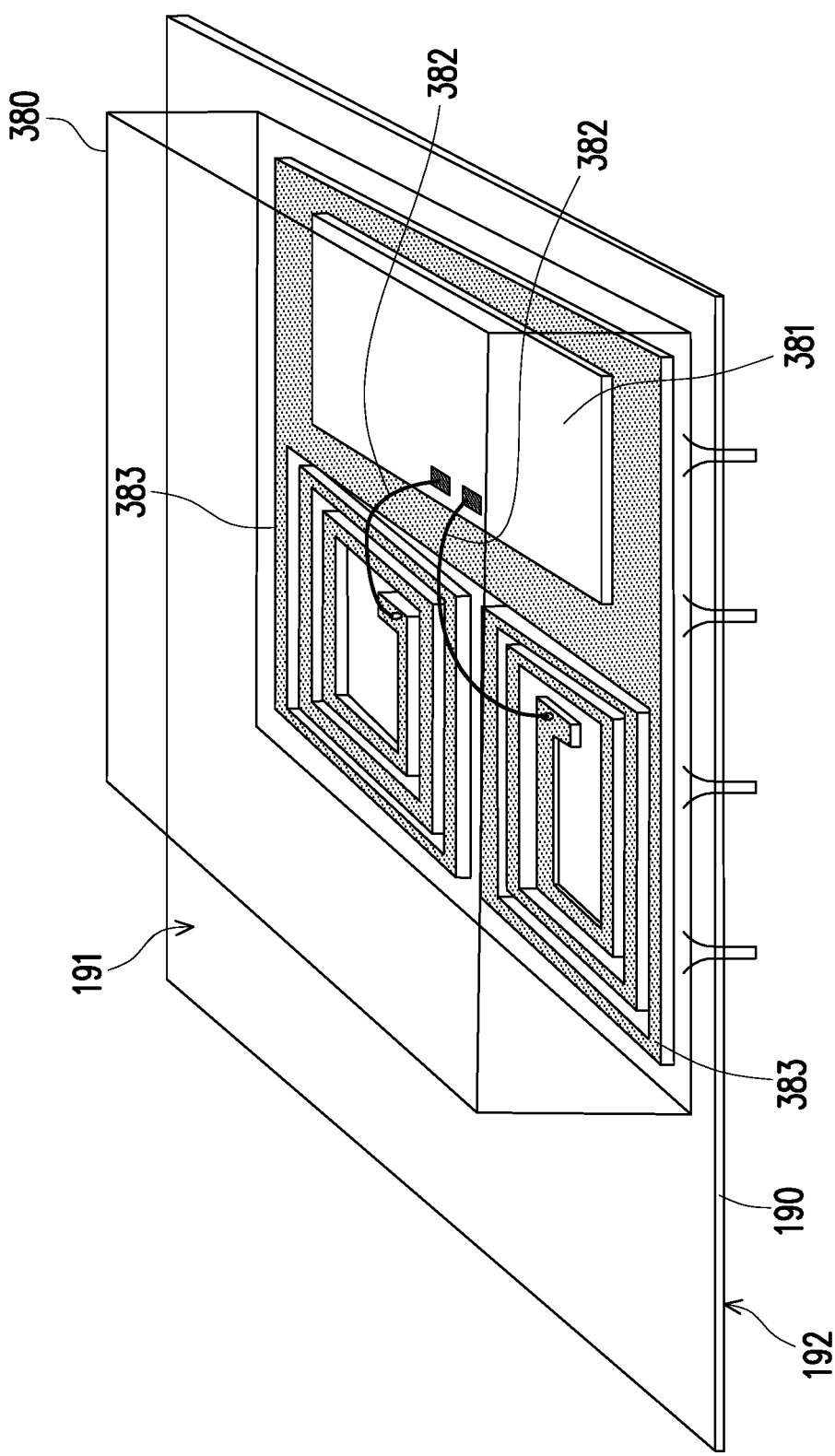
FIG. 3A is a schematic diagram of an integrated structure of a first circuit and a first main coil according to an embodiment of the disclosure.
Figure 3B:
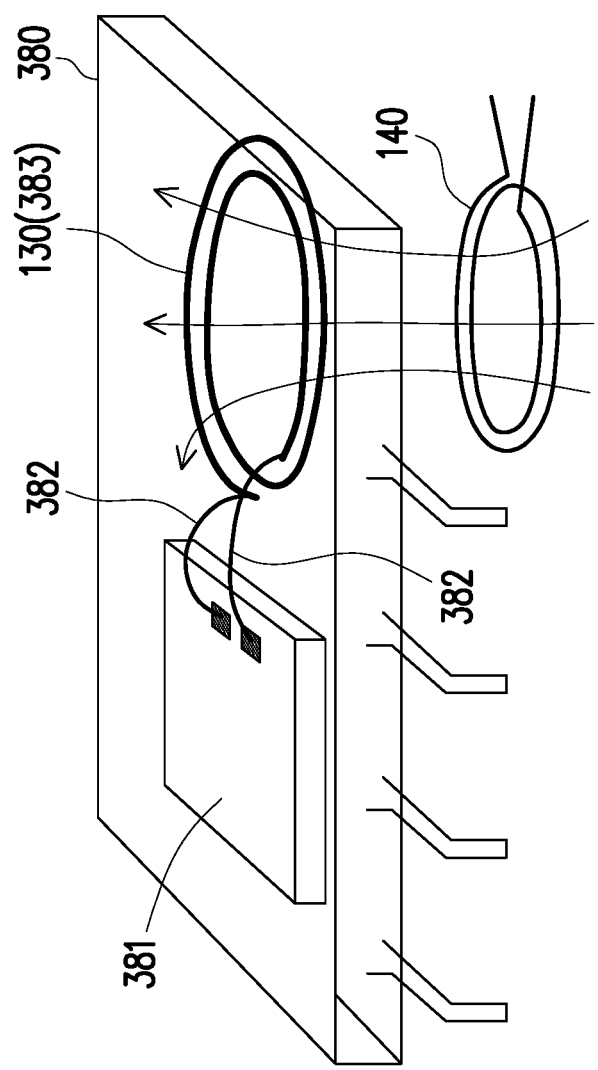
FIG. 3B is a schematic diagram showing the configuration of a second main coil and a first main coil which is fabricated by using a lead frame according to an embodiment of the disclosure.

In still another embodiment of the present disclosure, the first main coil 130 of FIG. 1 may be implemented by using a lead frame in a package structure of an integrated circuit. In detail, FIG. 3A is a schematic diagram of an integrated structure of a first circuit and a first main coil according to an embodiment of the disclosure, and FIG. 3B is a schematic diagram showing the configuration of a second main coil and a first main coil which is fabricated by using a lead frame according to an embodiment of the disclosure. Referring to FIG. 1, FIG. 3A and FIG. 3B together, the first circuit 110 and the first main coil 130 of FIG. 1 may be integrated into the package structure 380 of the integrated circuit, wherein the first circuit 110 is a die 381 in the package structure 380, and the first main coil 130 is fabricated by a lead frame 383 in the package structure 380. The first circuit 110 (i.e., die 381) may be electrically connected to two ends of the first main coil 130 (i.e., the lead frame 383) through a bonding wire 382.

In an embodiment of the disclosure, the second main coil 140 shown in FIG. 1 or FIG. 3B may be printed on the first surface 191 of the circuit board 190 shown in FIG. 3A, and the package structure 380 may be disposed on the first surface 191 of the circuit board 190 and disposed above the second main coil 140, wherein the orthogonal projection of the area surrounded by the first main coil 130 (i.e., the lead frame 383) on the circuit board 190 at least partially overlaps the area surrounded by the second main coil 140.

In another embodiment of the present disclosure, the second main coil 140 shown in FIG. 1 or FIG. 3B may be printed on the second surface 192 of the circuit board 190 shown in FIG. 3A, and the package structure 380 may be disposed on the first surface 191 of the circuit board 190, wherein the first surface 191 and the second surface 192 are opposite to each other, and the orthogonal projection of the area surrounded by the first main coil 130 (i.e., the lead frame 383) on the second surface 192 at least partially overlaps the area surrounded by the second main coil 140.

Figure 4:
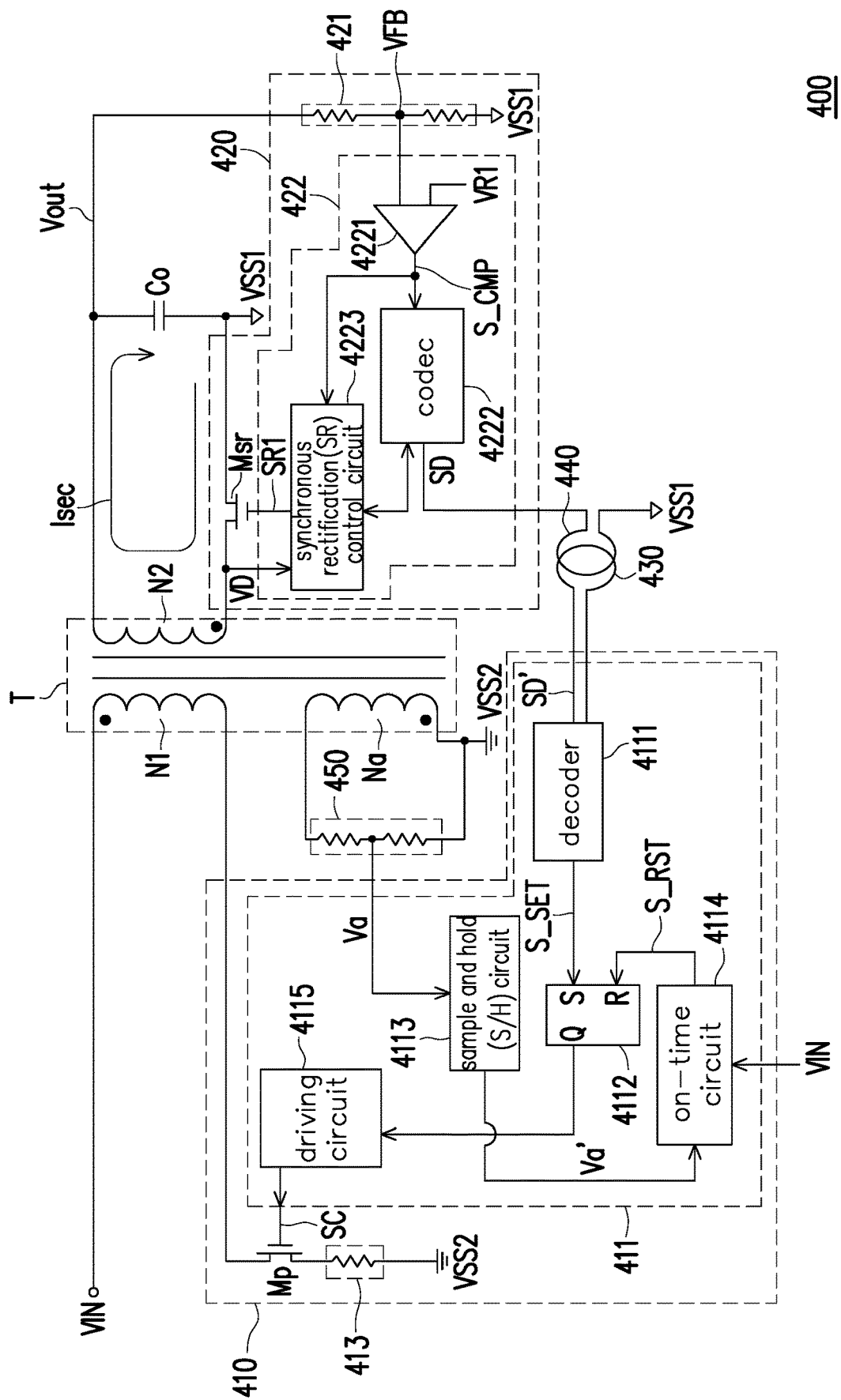
FIG. 4 is a schematic diagram of a circuit structure of a power conversion apparatus according to an embodiment of the disclosure.

Other implementations and operational details of the power conversion apparatus of the present disclosure are described below. For ease of explanation, the power conversion apparatus of the flyback type structure is described as an exemplary embodiment, but the disclosure is not limited thereto. FIG. 4 is a schematic diagram of a circuit structure of a power conversion apparatus according to an embodiment of the disclosure. Referring to FIG. 4, a power conversion apparatus 400 includes a transformer T, a first circuit 410, a second circuit 420, a first main coil 430, and a second main coil 440, but the present disclosure is not limited thereto. The implementation and operation of the first main coil 430 and the second main coil 440 of FIG. 4 are similar to the first main coil 130 and the second main coil 140 of FIG. 1, respectively, so that the relevant descriptions may be derived from FIG. 1 to FIG. 3B and thus omitted herein.

The transformer T includes the first winding N1, the second winding N2, and an auxiliary winding Na. In the embodiment shown in FIG. 4, the first winding N1 is exemplified as the primary side winding and second winding N2 is exemplified as the secondary side winding for description. The first end (for example, the common-polarity terminal, i.e., the dotted terminal) of the first winding N1 is configured to receive the input voltage VIN, and the first end (e.g., the opposite-polarity terminal, i.e., non-dotted terminal) of the second winding N2 is configured to provide the output voltage VOUT.

In the present embodiment, the first circuit 410 may include a power switch Mp, a first control circuit 411, and a current sensing circuit 413, but the present disclosure is not limited thereto. The first end of the power switch Mp is coupled to the second end (e.g., the opposite-polarity terminal, i.e., non-dotted terminal) of the first winding N1 of the transformer T. The second end of the power switch Mp is coupled to the second reference potential terminal VSS2 through the current sensing circuit 413. The power switch Mp is turned on or turned off by the switching signal SC.

The first control circuit 411 is coupled to the power switch Mp and the first main coil 430. The first control circuit 411 is configured to generate the switching signal SC according to the digital signal SD' received by the first main coil 430 to control on and off of the power switch Mp.

In addition, the first control circuit 411 may be coupled to the auxiliary winding Na directly or through the voltage-division circuit 450 to receive the auxiliary voltage Va related to the output voltage VOUT, and coupled to the first end of the first winding N1 to receive the input voltage VIN. The first control circuit 411 may modulate the pulse width of the switching signal SC according to the auxiliary voltage Va and the input voltage VIN, so that the frequency of the switching signal SC is fixed.

On the other hand, the second circuit 420 is coupled to the first end of the second winding N2 to receive the output voltage VOUT, and coupled to the second end (e.g., the common-polarity terminal, i.e., the dotted terminal) of the second winding N2. The second circuit 420 may divide the output voltage VOUT to generate a feedback voltage VFB. When the feedback voltage VFB is less than the first reference voltage VR1, the second circuit 420 may output a digital signal SD of N pulses through the second main coil 440, wherein N is a positive integer. In this manner, the first control circuit 411 may receive the digital signal SD' of the N pulses through the first main coil 430, and may generate the switching signal SC in response to the N pulses to turn on the power switch Mp, thereby modulating the output voltage VOUT or the output current of the power conversion apparatus 400. Detailed descriptions are provided below.

In the present embodiment, the second circuit 420 may include a voltage-division circuit 421, a second control circuit 422, and a synchronous rectification (SR) transistor Msr. The voltage-division circuit 421 is coupled to the first end of the second winding N2 to receive the output voltage VOUT, and divides the output voltage VOUT to generate a feedback voltage VFB. The SR transistor Msr is coupled between the second end of the second winding N2 and the first reference potential terminal VSS1, and is controlled by the control signal SR1.

The second control circuit 422 is coupled to the voltage-division circuit 421, the SR transistor Msr, and the second main coil 440. The second control circuit 422 may compare the feedback voltage VFB with the first reference voltage VR1. If the feedback voltage VFB is less than the first reference voltage VR1, the second control circuit 422 will generate the control signal SR1 to turn off the SR transistor Msr, and the second control circuit 422 outputs the N pulses to the second main coil 440. In addition, the second control circuit 422 is also configured to detect the drain voltage VD of the SR transistor Msr. If the drain voltage VD is less than the second reference voltage, the second control circuit 422 will generate the control signal SR1 to turn on the SR transistor Msr. The operation of the power conversion apparatus 400 will be described in more detail below.

Figure 5:
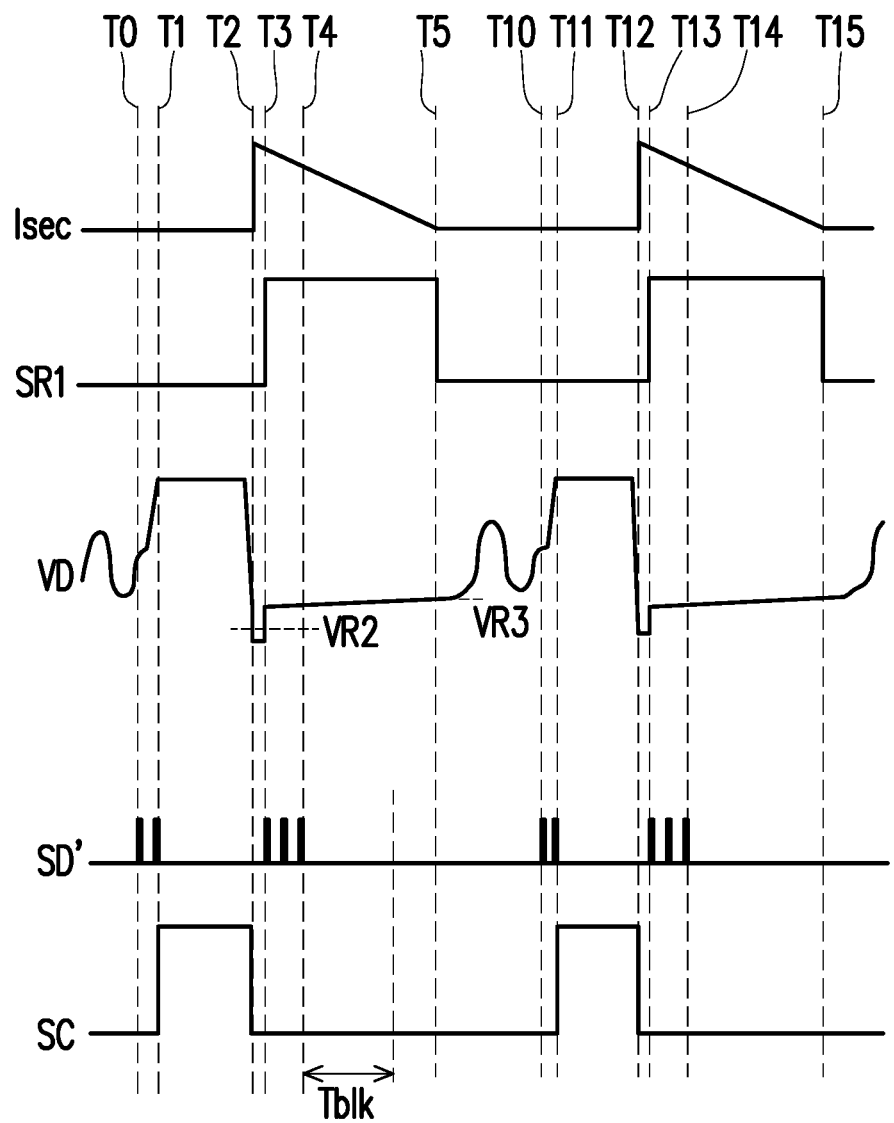
FIG. 5 is a signal timing diagram of the power conversion apparatus of FIG. 4 in a discontinuous conduction mode according to an embodiment of the disclosure.

FIG. 5 is a signal timing diagram of the power conversion apparatus of FIG. 4 in a discontinuous conduction mode according to an embodiment of the disclosure. Please refer to FIG. 4 and FIG. 5 together. At time point T0, the second control circuit 422 determines that the feedback voltage VFB is less than the first reference voltage VR1, so the second control circuit 422 generates a control signal SR1 with a logical low-level to turn off the SR transistor Msr, and the second control circuit 422 outputs two pulses (i.e., N is 2) to the second main coil 440. The first control circuit 411 may receive the digital signal SD' of two pulses through the first main coil 430. Therefore, at the time point T1, the first control circuit 411 may switch the switching signal SC to a logical high-level to turn on the power switch Mp in response to the two pulses.

At time point T1, the power switch Mp is turned on, and the input voltage VIN supplies power to the first winding N1 of the transformer T for energy storage. At the same time, the SR transistor Msr and its internal parasitic diode (not shown) are in an off state. Therefore, the voltage level of the drain voltage VD of the SR transistor Msr is K×VIN, wherein K is the turn ratio of the second winding N2 and the first winding N1 of the transformer T.

At time point T2, the first control circuit 411 switches the switching signal SC to the logical low-level to turn off the power switch Mp. Based on Lenz's law, the energy stored in the first winding N1 of the transformer T will be transferred to the second winding N2 of the transformer T. Meanwhile, the parasitic diode in the SR transistor Msr is turned on in the forward bias. Therefore, the voltage level of the drain voltage VD of the SR transistor Msr is decreased from K×VIN to a negative voltage value.

When the voltage level of the drain voltage VD of the SR transistor Msr is less than the second reference voltage VR2, the second control circuit 422 switches the control signal SR1 to the logical high-level to turn on the SR transistor Msr as shown by time point T3. Therefore, the energy transferred to the second winding N2 of the transformer T charges the capacitor Co and supplies the output voltage VOUT to the load. On this occasion, the secondary side current Isec flows from the first reference potential terminal VSS1 to the second winding N2 through the internal conducted channel of the SR transistor Msr.

After the second control circuit 422 turns on the SR transistor Msr, the second control circuit 422 generates a digital signal SD of M pulses to the second main coil 440, wherein M is a positive integer and M is not equal to N. In the present embodiment, M may be 3, but is not limited thereto. The first control circuit 411 may set the blank time interval Tblk in response to the received M pulses. The first control circuit 411 ignores the digital signal SD' received from the first main coil 430 during the blank time interval Tblk to prevent the first control circuit 411 from turning on the power switch Mp due to misjudgment, so that the transformer T can be prevented from being short-circuited.

After the blank time interval Tblk and in the state where the SR transistor Msr is on, if the second control circuit 422 receives any signal through the second main coil 440, it represents that the first main coil 430 and the second main coil 440 are interfered by noise, then the second control circuit 422 may switch the control signal SR1 to the logical low-level to turn off the SR transistor Msr. Since the first control circuit 411 might incorrectly turn on the power switch Mp due to the influence of noise, the second control circuit 422 turns off the SR transistor Msr to prevent the power switch Mp and the SR transistor Msr from being on simultaneously and causing a short circuit in transformer T. In addition, after the SR transistor Msr is turned off for a predetermined time length, if the second control circuit 422 does not receive any signal through the second main coil 440, it represents that the first main coil 430 and the second main coil 440 are no longer interfered by noise, then the second control circuit 422 may re-turn on the SR transistor Msr.

As the energy stored by the second winding N2 continuously charges the capacitor Co, the secondary side current Isec gradually decreases, causing the voltage level of the drain voltage VD to rise. When the voltage level of the drain voltage VD rises to the third reference voltage value VR3, the secondary side current Isec drops to zero, indicating that the energy stored by the second winding N2 has been completely released, so the second control circuit 422 turns off the SR transistor Msr as shown by time point T5. It can be understood that the time interval from the time point T3 to the time point T5 is the conduction time of the SR transistor Msr.

At time point T5, both the power switch Mp and the SR transistor Msr are in an off state. Since the energy stored in the transformer T has been completely transferred, the parasitic capacitance in the first winding N1 and the power switch Mp and the inductance of the first winding N1 begin to resonate until the power switch Mp is turned on again. The power conversion apparatus 400 may repeatedly perform operations similar to those performed from the time point T0 to the time point T5, such as the operation shown by the time point T10 to the time point T15.

In an embodiment of the disclosure, the first control circuit 411 may include a decoder 4111, a SR flip-flop 4112, a sample and hold (S/H) circuit 4113, an on-time circuit 4114, and a driving circuit 4115, but is not limited thereto. The decoder 4111 is coupled to the first main coil 430 to receive the digital signal SD', and decodes the digital signal SD' to generate the set signal S_SET and set the blank time interval Tblk (shown in FIG. 4), wherein the set signal S_SET is configured to control the time point of one time of the power switch Mp. The S/H circuit 4113 may be coupled to the auxiliary winding Na directly or through the voltage-division circuit 450 to sample and hold the auxiliary voltage Va, and generate a sampled voltage Va' accordingly. The on-time circuit 4114 is coupled to the S/H circuit 4113 to receive the sampled voltage Va' and receive the input voltage VIN. The on-time circuit 4114 may generate a reset signal S_RST according to the input voltage VIN and the sampled voltage Va', wherein the reset signal S_RST is configured to control the off-time point of the power switch Mp. The set terminal S of the SR flip-flop 4112 is coupled to the decoder 4111 to receive the set signal S_SET. The reset terminal R of the SR flip-flop 4112 is coupled to the on-time circuit 4114 to receive the reset signal S_RST. The non-inverting output terminal Q of the SR flip-flop 4112 is coupled to the input terminal of the driving circuit 4115, and the output terminal of the driving circuit 4115 outputs the switching signal SC. With regard to other operational details of the decoder 4111, the SR flip-flop 4112, the S/H circuit 4113, the on-time circuit 4114, and the driving circuit 4115, sufficient teaching may be obtained from the description of the first control circuit 411 in FIG. 4 and FIG. 5, and thus omitted herein.

In an embodiment of the disclosure, the on-time circuit 4114 may be implemented by using a well-known on-time circuit which can adjust the length of on-time.

In an embodiment of the disclosure, the decoder 4111 may be implemented by using a counter that may be used to count the number of pulses in a specific time interval, but the disclosure is not limited thereto.

In another embodiment of the present disclosure, the first control circuit 411 may also be implemented by using a micro-controller or a micro-processor.

In an embodiment of the disclosure, the second control circuit 422 may include a comparator 4221, a codec 4222, and a synchronous rectification (SR) control circuit 4223. The comparator 4221 is coupled to the voltage-division circuit 421 to receive the feedback voltage VFB, and compares the feedback voltage VFB with the first reference voltage VR1 to generate a comparison signal S_CMP. The codec 4222 is coupled to the comparator 4221 and the second main coil 440. The codec 4222 may perform encoding according to the comparison signal S_CMP to generate the digital signal SD. The SR control circuit 4223 is coupled to the comparator 4221, the codec 4222, and the SR transistor Msr.

If the comparison signal S_CMP indicates that the feedback voltage VFB is less than the first reference voltage VR1, the SR control circuit 4223 will generate the control signal SR1 to turn off the SR transistor Msr, and the codec 4222 outputs N pulses to the second main coil 440, and the N pulses are transmitted to the first control circuit 411 through the first main coil 430, such that the first control circuit 411 turns on the power switch Mp. In addition, the SR control circuit 4223 detects the drain voltage VD of the SR transistor Msr. If the drain voltage VD is less than the second reference voltage VR2 (shown in FIG. 5), the SR control circuit 4223 will generate the control signal SR1 to turn on the SR transistor Msr. After the SR transistor Msr is turned on, the SR control circuit 4223 may instruct the codec 4222 to output M pulses to the second main coil 440 and transmit the M pulses to the first control circuit 411 through the first main coil 430, such that the first control circuit 411 sets the blank time interval Tblk accordingly. After the blank time interval Tblk, if the codec 4222 receives any signal through the second main coil 440, it indicates that the first main coil 430 and the second main coil 440 are interfered by the noise, then the codec 4222 may instruct the SR control circuit 4223 to turn off the SR transistor Msr. With regard to other operational details of the comparator 4221, the codec 4222, and the SR control circuit 4223, sufficient teachings can be obtained from the description of the second control circuit 422 in FIG. 4 and FIG. 5 and thus omitted herein.

In an embodiment of the disclosure, the codec 4222 may be implemented by using a pulse generator and a counter, but the disclosure is not limited thereto.

In an embodiment of the disclosure, the SR control circuit 4223 may be implemented by using a known synchronous rectification controller.

In another embodiment of the disclosure, the second control circuit 422 may also be implemented by using a microcontroller or a microprocessor.

In summary, the power conversion apparatus proposed in the embodiment of the present disclosure uses a magnetic coupling element as a signal transmission medium between the primary side and the secondary side of the power conversion apparatus. Since the magnetic coupling element has the advantages of low cost and high integration, the manufacturing cost of the power conversion apparatus can be effectively reduced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:
1. A power conversion apparatus, comprising:
    a circuit board, wherein the circuit board has a first surface and a second surface opposite to each other;
    a transformer, disposed on the circuit board, wherein the transformer has a first winding and a second winding, a first end of the first winding is configured to receive an input voltage, and a first end of the second winding is configured to provide an output voltage;
    a first circuit, disposed on the circuit board, coupled to the first end of the first winding to provide the input voltage, and coupled to a second end of the first winding;
    a second circuit, disposed on the circuit board, coupled to the first end of the second winding to receive the output voltage, and coupled to a second end of the second winding;
    a first main coil, two ends of the first main coil coupled to the first circuit; and
    a second main coil, printed on the circuit board, a first end of the second main coil coupled to the second circuit, and a second end of the second main coil directly connected to a first reference potential terminal, wherein the first main coil is magnetically coupled to the second main coil, and the first main coil and the second main coil are electrically insulated from each other,
    wherein the first circuit and the second circuit perform digital signal communication through the first main coil and the second main coil to control a voltage value of the output voltage,
    wherein the first main coil is printed on the first surface of the circuit board, the second main coil is printed on the second surface of the circuit board, and the first main coil and the second main coil are printed on the identical circuit board,
    wherein the first main coil and the second main coil are formed as a coreless magnetic coupling element for a digital signal transmission medium between the first circuit and the second circuit.

2. The power conversion apparatus according to claim 1, wherein an orthogonal projection of an area surrounded by the second main coil on the first surface at least partially overlaps an area surrounded by the first main coil.

3. The power conversion apparatus according to claim 1, wherein the circuit board has a first surface and a second surface opposite to each other, wherein:
    the first main coil comprises a first sub-coil and a second sub-coil, a first end of the first sub-coil is coupled to the first circuit, and a second end of the first sub-coil is coupled to a second reference potential terminal, a first end of the second sub-coil is coupled to the first circuit, and a second end of the second sub-coil is coupled to the second reference potential terminal,
    wherein the first sub-coil and the second sub-coil are printed on the first surface of the circuit board, the second main coil is printed on the second surface of the circuit board, and an orthogonal projection of an area surrounded by the second main coil on the first surface at least partially overlaps an area surrounded by the first sub-coil,
    wherein the second sub-coil is located at a side of the first sub-coil, and an area surrounded by the first sub-coil does not overlap an area surrounded by the second sub-coil.

4. The power conversion apparatus according to claim 1, wherein:
    the first circuit and the first main coil are integrated in a package structure, the first circuit and the first main coil are respectively a die and a lead frame in the package structure, and the first circuit and the first main coil are electrically connected to each other through a bonding wire, wherein an orthogonal projection of an area surrounded by the first main coil on the circuit board at least partially overlaps an area surrounded by the second main coil.

5. The power conversion apparatus according to claim 1, wherein the first circuit comprises:
    a power switch, coupled to the second end of the first winding and controlled by a switching signal; and
    a first control circuit, coupled to the power switch and the first main coil, configured to generate the switching signal according to a digital signal received by the first main coil to control on and off of the power switch.

6. The power conversion apparatus according to claim 5, wherein:
    the second circuit generates a feedback voltage by dividing the output voltage, when the feedback voltage is less than a first reference voltage, the second circuit outputs the digital signal of N pulses through the second main coil, such that the first control circuit generates the switching signal in response to the N pulses to turn on the power switch, wherein N is a positive integer.

7. The power conversion apparatus according to claim 6, wherein the transformer further has an auxiliary winding, wherein:
    the first control circuit is further coupled to the auxiliary winding to receive an auxiliary voltage related to the output voltage, and coupled to the first end of the first winding to receive the input voltage, wherein the first control circuit modulates a pulse width of the switching signal according to the auxiliary voltage and the input voltage, such that a frequency of the switching signal is fixed.

8. The power conversion apparatus according to claim 7, wherein the first control circuit comprises:
    a decoder, coupled to the first main coil to receive the digital signal, and decoding the digital signal to generate a set signal;
    a sample and hold (S/H) circuit, coupled to the auxiliary winding, and configured to sample and hold the auxiliary voltage, and generating a sampled voltage accordingly;
    an on-time circuit, coupled to the S/H circuit to receive the sampled voltage, and receiving the input voltage, wherein the on-time circuit generates a reset signal according to the input voltage and the sampled voltage;
    a SR flip-flop, a set terminal of the SR flip-flop coupled to the decoder to receive the set signal, and a reset terminal of the SR flip-flop coupled to the on-time circuit to receive the reset signal; and
    a driving circuit, an input terminal of the driving circuit coupled to a non-inverting output terminal of the SR flip-flop, and an output terminal of the driving circuit outputting the switching signal.

9. The power conversion apparatus according to claim 6, wherein the second circuit comprises:
    a voltage-division circuit, coupled to the first end of the second winding to receive the output voltage, and dividing the output voltage to generate a feedback voltage;
    a synchronous rectification (SR) transistor, coupled between the second end of the second winding and the first reference potential terminal, and controlled by a control signal; and
    a second control circuit, coupled to the voltage-division circuit, the SR transistor, and the second main coil, wherein the second control circuit compares the feedback voltage with the first reference voltage, and if the feedback voltage is less than the first reference voltage, the second control circuit generates the control signal to turn off the SR transistor, and the second control circuit outputs the N pulses to the second main coil.

10. The power conversion apparatus according to claim 9, wherein the second control circuit comprises:
    a comparator, coupled to the voltage-division circuit to receive the feedback voltage, and comparing the feedback voltage with the first reference voltage to generate a comparison signal;
    a codec, coupled to the comparator and the second main coil, and configured to perform encoding according to the comparison signal to generate the digital signal; and
    a synchronous rectification (SR) control circuit, coupled to the comparator, the codec, and the SR transistor,
    wherein if the comparison signal indicates that the feedback voltage is less than the first reference voltage, the SR control circuit generates the control signal to turn off the SR transistor, and the codec outputs the N pulses to the second main coil.

11. The power conversion apparatus according to claim 9, wherein:
    the second control circuit is further configured to detect a drain voltage of the SR transistor, and if the drain voltage is less than a second reference voltage, the second control circuit generates the control signal to turn on the SR transistor.

12. The power conversion apparatus according to claim 11, wherein:
    after the second control circuit turns on the SR transistor, the second control circuit generates the digital signal of M pulses to the second main coil, such that the first control circuit sets a blank time interval in response to the M pulses, and the first control circuit ignores the digital signal received from the first main coil during the blank time interval, wherein M is a positive integer and M is not equal to N.

13. The power conversion apparatus according to claim 12, wherein:
    after the blank time interval and when the SR transistor is in an on state, the second control circuit generates the control signal to turn off the SR transistor if the second control circuit receives a signal through the second main coil.

* * * * *